May 5, 1936.  A. C. HARTLEY  2,039,411
SEPARATION OF GASES FROM LIQUIDS
Filed May 9, 1932  3 Sheets-Sheet 1

Inventor
A. C. Hartley:
by
W. E. Evans.
Attorney.

May 5, 1936. A. C. HARTLEY 2,039,411
SEPARATION OF GASES FROM LIQUIDS
Filed May 9, 1932 3 Sheets-Sheet 2
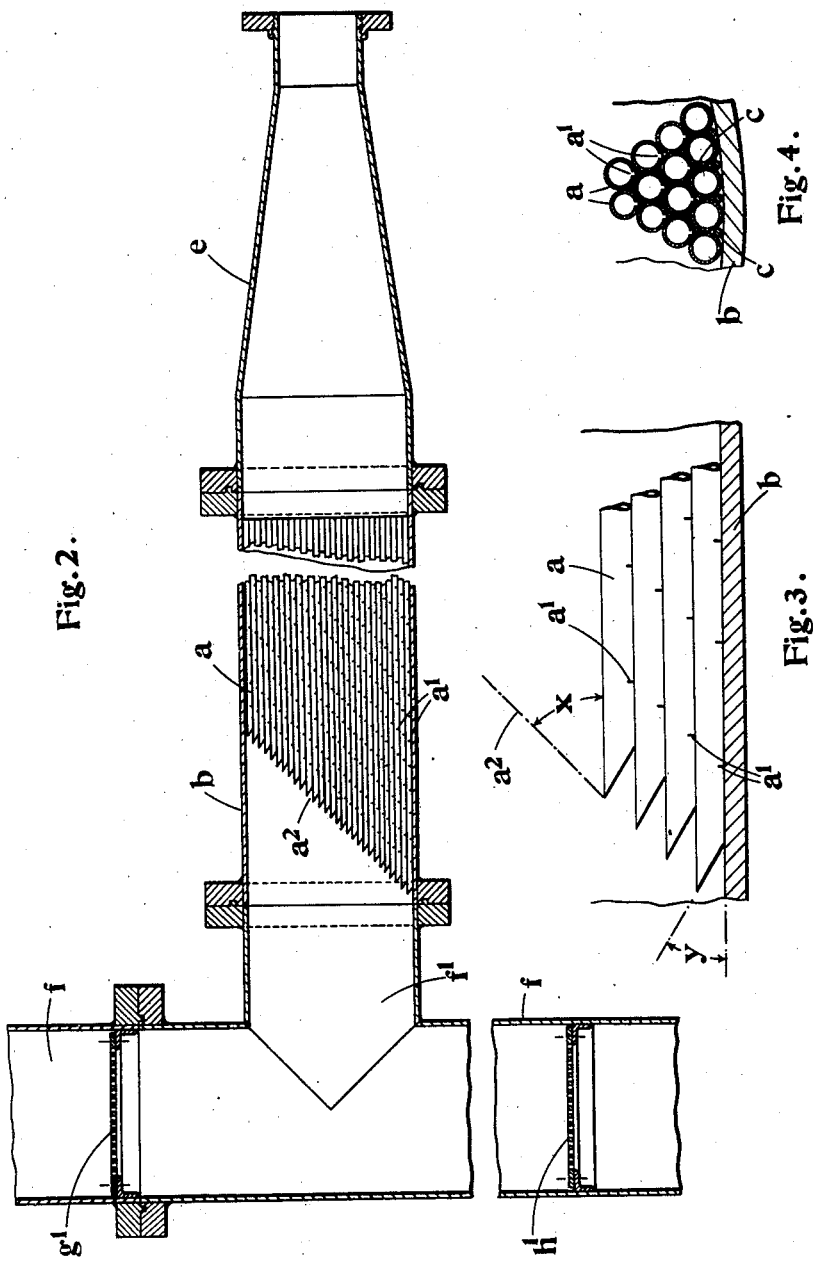
Inventor
A. C. Hartley;
by
W. E. Evans,
Attorney.

UNITED STATES PATENT OFFICE 2,039,411

SEPARATION OF GASES FROM LIQUIDS

Arthur Clifford Hartley, Finsbury Circus, London, England

Application May 9, 1932, Serial No. 610,112
In Great Britain February 26, 1932

13 Claims. (Cl. 183—114.5)

This invention relates to the separation of gases from liquids.

The invention is of especial application in the separation of gases evolved from mineral oil on the reduction of its pressure on leaving the oil well, in which application it has among its objects to avoid foaming and the entrainment of oil with the gas and to secure effective separation of gas from the oil by simple means at a relatively high rate of throughput of the oil. The invention is however of general application in the separation of gases from liquids, whether the presence of gas is due to reduction of pressure, increase in temperature or any other cause.

According to the invention the liquid such as a mineral oil under pressure or other liquid containing gas, from which the gas is to be separated, is caused to pass in a determined course in a plurality of relatively narrow or shallow and substantially rectilinear streams, whereby as the consequence of the reduction or elimination of turbulence in the narrow or shallow streams the minute bubbles of gas carried suspended in the liquid may rise, and by mutual attraction form larger bubbles of gas, the bubbles coalescing as they accumulate whereby their upward movement is accelerated, and coming to the surface before the streams discharge at the end of their course. The gas bubbles are thus segregated rapidly and substantially completely from the liquid in the streams and flow buoyant and in such volume above the liquid in the streams that the separation of the gas is facilitated on rising to the surface and on discharge of the streams.

It is an object of the invention where the content of gas to be released is substantial and the viscosity of the liquid permits, to separate a stream of gas from the stream of liquid before the end of the course of the divided streams, and thus to form a surface above the liquid and to facilitate the release of the remaining bubbles of gas and their separation from the liquid at the surface before discharge of the streams.

It will be understood that the effectiveness of the means provided according to the invention depends upon a substantially streamline flow or upon a flow that is substantially less turbulent than that of an undivided stream of the same total volume of liquid flowing at the same velocity in a single conduit; such a flow being possible with high rate of throughput of the liquid at relatively high velocity in narrow streams in a course of such length or in a period of such duration that by reason of the consequent reduction or elimination of turbulence in the narrow streams there is segregation of the bubbles of gas on rising to the surface before discharge of the streams. Thus the course and velocity of the streams are such in relation to the character or viscosity of the liquid as to permit this segregation of the gas bubbles, whereby in a simple way a state of substantial equilibrium is rapidly attained of the gas and liquid in the streams under the conditions of temperature and pressure that may prevail.

Precision in the determination of the length of the course of the streams in particular cases is not essential, where so long as the length of the course and the time factor are sufficient for the segregation of the bubbles of gas on rising to the surface before discharge of the streams, excess in the length of the course beyond that sufficient for this purpose involves no material practical disadvantage.

According to the invention moreover a number of closely set tubes of small diameter and of determined length are mounted lengthwise and advantageously in parallel within a large tube or conduit, so that the small tubes may completely occupy the large tube or conduit at the position in which they are set; to one end of the large tube or conduit the liquid from which the gas is to be separated is admitted and at the opposite end the large tube or conduit may be connected to a casing or the equivalent, or be provided with a chamber, adapted for the reception of the liquid and gas on the discharge of the streams at the forward ends of the small tubes, and provision made of separate outlets for the liquid and gas from the casing or chamber.

It will be understood that the large tube or conduit may have any convenient cross-sectional shape, but a tube of circular cross-section is in general preferred; and instead of small tubes closely or substantially parallel disposed partitions or the equivalent may be provided lengthwise within the large tube, casing or conduit to yield in the latter a series of narrow or shallow interstitial spaces of any convenient cross-sectional shape so long as they are narrow or shallow and lie closely together and advantageously in substantially parallel position. Thus where such partitions are provided they may be disposed in vertical or horizontal or inclined planes to yield a corresponding series of substantially narrow or shallow vertical, horizontal or inclined interstitial spaces defined at opposite ends by the wall of the large tube, casing or conduit; or these narrow or shallow interstitial spaces may be divided lengthwise by partitions or otherwise to form a plurality of closely lying or substantially parallel spaces of smaller cross-section; or again the smaller tubes or conduits enclosed within the large tube, casing or conduit may be provided as an integral unit. It is thus possible for a complete and self-contained unit to be provided comprising the large tube, casing or conduit with the smaller tubes or conduits within, for connection in a pipe line, for the separation of gas from the liquid flowing in that line. Any means are however within the scope of the invention for providing a plurality of closely disposed narrow or shallow conduits of any desired cross-sectional shape for the purpose indicated, that are not necessarily enclosed within a large tube, casing or conduit, but may be adapted for the passage through them in substantially streamline flow of the liquid from which the gas is to be separated, or in a flow substantially less turbulent than that of an undivided stream of the same total volume of liquid flowing at the same velocity in a single conduit from which the liquid may issue on being divided into the narrow or shallow streams.

It will be understood that the close or substantially parallel disposition of the small tubes when employed is desirable having regard to general practical convenience of construction, but that the small tubes may with advantage be otherwise disposed so long as they are adapted for flow of liquid through them under the conditions hereinbefore described.

It will furthermore be understood that the liquid from which the gas is to be separated is preferably caused to flow at a velocity substantially above the critical velocity that is to say at a velocity in the undivided stream that will produce substantial turbulence, before passing in narrow streams in a determined course in the manner hereinbefore described, and that when separating the gas from a liquid in a number of stages (such as crude mineral oil under pressure from the well), the liquid may advantageously be caused to flow in the undivided or re-united streams at substantially above the critical velocity that is to say at a velocity in the undivided stream that will produce substantial turbulence, before each stage of gas separation may be reduced in pressure, whereby a maximum amount of gas may thus be formed before the substantially streamline or substantially less turbulent flow in narrow or shallow streams in the respective stages.

The invention comprises the features of method and apparatus which are hereinafter described.

The invention is diagrammatically illustrated in the accompanying drawings, in which Figure 1 illustrates in elevation partly in section an apparatus provided according to the invention for effecting the separation of gas from crude oil under pressure, after the partial reduction of its pressure on leaving the well.

Figure 2 is a sectional elevation on a larger scale of the gas separator unit and connected parts in the construction illustrated in Figure 1.

Figures 3 and 4 show in elevation and cross-section respectively a portion of the nest of tubes at the front of the nest illustrated in Figure 2.

Figure 1:
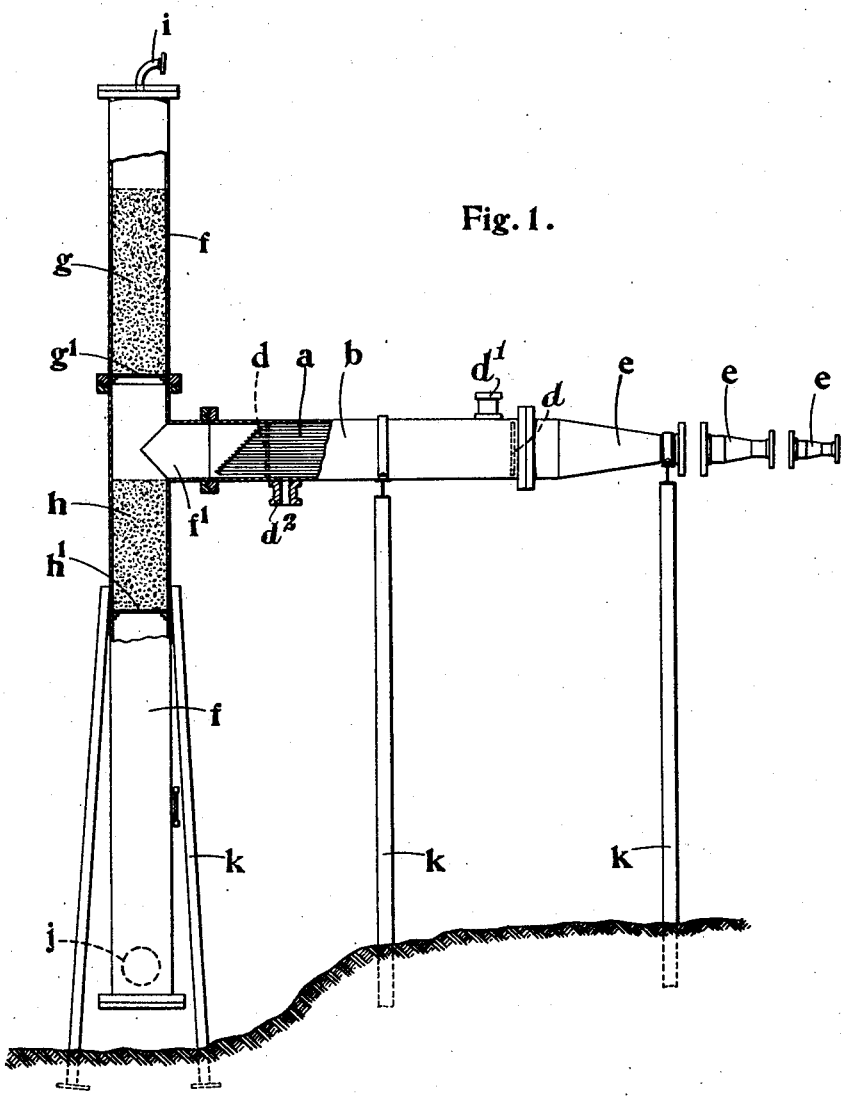

In carrying the invention into effect as illustrated in Figures 1 to 4 of the accompanying drawings in its application to an apparatus for separation of gas from crude oil after the partial reduction of its pressure on leaving the well, a substantially streamline flow or a flow substantially less turbulent than that of the undivided stream of liquid, is imparted to the crude oil by passing the crude oil through a nest of closely disposed and substantially parallel tubes $a$ of small diameter, of a number determined according to the intended throughput of crude oil and arranged lengthwise within a horizontal tube $b$ of relatively large diameter, and of a length corresponding to that of the nest of tubes. The small tubes $a$ of the nest are conveniently wedged tightly in position by means of tapered steel dowels $c$ at the ends (as illustrated in Figure 4) or mounted at their ends and in intermediate positions in tube plates such as $d\ d$ (Figure 1), so that the nest of small tubes $a$ completely fills the large tube $b$ at the position in which the nest is set. The use of tube plates such as $d\ d$ (Figure 1) may be avoided by tightly wedging the small tubes $a$ in position as illustrated in Figures 2 and 4, so that the inter-tube spaces may be used for the flow of the liquid, and thus the throughput increased. The large tube $b$ may be connected at the rear with a tube section or sections $e$ (Figure 1) of conical form, a section of pipe of uniform diameter according to practical requirements being optionally interposed between the sections, while at the narrow end of the end section $e$, the end of the pipe line may be connected, a suitable reduction valve being interposed. In this way at the relatively high velocity of the undivided stream which is advantageously substantially above the critical velocity that is to say at a velocity in the undivided stream that will produce substantial turbulence substantially all the gas possible may be released under the conditions of temperature and pressure that may prevail, before the mixture of liquid and gas passes through the small tubes $a$. At the front end the large tube $b$ may be connected to the transverse branch $f^1$ of a vertical casing or tube $f$ into the lower part of which the liquid flows and into the upper part the gas, on discharge from the front end of the nest of small tubes $a$. At the lower end of the upper part of the vertical casing or tube $f$ a filter bed $g$ of a material such as steel turnings may be mounted upon a perforated plate $g^1$ while at the upper end of the lower part of the vertical casing or tube $f$ a filter bed $h$ of similar or other material may be mounted upon a perforated plate $h^1$. An outlet pipe $i$ for the gas is provided at the upper end of the casing or tube $f$ adapted for regulation by means of a valve, while an outlet pipe $j$ may be provided at the lower end of the casing or tube $f$ adapted with a valve for the purpose of the control of discharge of the liquid. The oil may pass forward through other similar apparatus for the separation of gas on the further reduction of pressure in further stages as illustrated in the modified construction diagrammatically represented in Figure 6, and the oil may be caused to flow at a velocity substantially above the critical velocity that is to say at a velocity that will produce substantial turbulence before being again passed in substantially less turbulent or streamline flow in the manner hereinbefore described in the further successive stages of treatment until the oil is reduced in pressure and the gas separated therefrom to the extent required, while the gas may pass forward for utilization or further treatment. The apparatus thus constituted may be conveniently supported by frame members such as k (Figure 1) or otherwise whereby the large tube b is maintained in a substantially horizontal position.

At $a^1$ (Figure 4) and adjacent the positions indicated $a^1$ (Figures 2 and 3) a series of small holes or slots is advantageously provided at the front end and at the bottom of the small tubes a in order that a part of the oil flowing in the small tubes may pass down into the enlarged inter-tube spaces. The series of small holes $a^1$ may for example extend for a distance of three feet or more or less, and the tubes may be disposed or formed so as to diverge from each other severally or in sets in direction towards the discharging end, or for that part only of their length in which the small holes $a^1$ are provided. By such means the inter-tube spaces afford a passage for the liquid in the streams from which the gas bubbles are freed, a condition of advantage where the proportion of oil to gas is relatively considerable or relatively small, and facilitating the separation of the gas. Where tube plates such as d are provided the front tube plate may be disposed at a position immediately behind that at which the tubes diverge.

Figure 7:
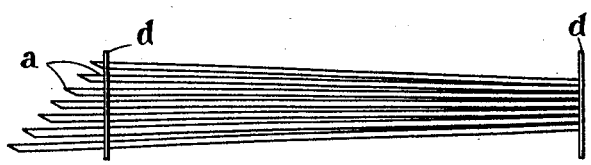
Figure 7 illustrates a modification of the bundle of narrow tubes $a$ which instead of being disposed parallel as in Figure 1, diverge towards their position of discharge.

Figure 7 illustrates a construction in which the tubes a are set so as to diverge towards the position of discharge.

In an apparatus such as described for use in the separation of gas from crude mineral oil after partial reduction of its pressure, the large tube or unit b in which the nest of small tubes a is mounted, may for example have a length of 10 feet and a bore of 21 inches, while the vertical tube or casing f may have the same bore and the narrow tubes a may be of an external diameter of ⅝", and the total length of the conical tube sections e may for example be 10 feet. The liquid or oil may be passed to the narrow end of the conical tube sections through a three inch pipe at a velocity above the critical velocity that is to say at a velocity that will produce substantial turbulence, while the velocity of flow of the oil through the small tubes a may be of the order of six inches to three feet per second. It will be understood that these figures are given by way of example only and involve no limitation.

It will further be understood that the flow of liquid through the narrow tubes a is advantageously streamline, but it may be otherwise substantially less turbulent than in the undivided or re-united streams flowing in the tube sections e. Furthermore the throughput may advantageously be increased until the gas above the liquid in the narrow or shallow streams has attained turbulent flow, provided the velocity be not sufficiently high to cause excessive turbulence of the liquid in the narrow or shallow streams and the remixing of the gas with oil. Under such conditions of increased throughput the gas bubbles may be swept away from the surface of the oil as soon as they emerge.

It will further be understood that by causing the crude mineral oil, after the partial reduction of the oil pressure, to flow in a determined course in a plurality of narrow streams within the small tubes a the bubbles of gas in the manner hereinbefore described are rapidly and substantially completely segregated from the liquid in the streams and the separation of gas from the liquid is effected on the bubbles of gas rising to the surface of the liquid and the discharge of the streams.

The tubes a as illustrated in Figures 1, 2 and 3 may be graduated in length so that the front ends may extend successively forward from the top downwards, whereby the shorter tubes are at the top and the longer tubes at the bottom, the disposition being such that the front ends of the small tubes lie at an angle x (Figure 3) such for example as 45° or less to the horizontal, and each small tube a may at the front end be cut at an angle y (Figure 3) such for example as 30°, or less, and be so disposed that the angular front end of the tube lies in its uppermost position, whereby the liquid as it leaves the front end of the tubes a may freely fall over the front end of the tubes next beneath in a cascading flow, and the upward escape of gas under these conditions may be facilitated. The extent of the cascading flow may be increased by making the angles x and y smaller, or by extending the front ends of the tubes forward from those immediately above to an extent substantially more than indicated in Figure 3.

The gas separating unit comprising the nest of tubes a within the large tube b may have the tubes a advantageously disposed substantially parallel and in substantially horizontal line, but no limitation is involved to these conditions so long as the bubbles of gas may rise to the surface in a direction transversely or at an angle to the direction of flow as hereinbefore described. Thus the small tubes or conduits a may be inclined upwardly or downwardly towards the position of discharge, but it is in general preferred that they are disposed to lie substantially horizontally.

An apparatus as diagrammatically illustrated in Figure 1 has been found effective for the separation of gas from crude mineral oil in stages on the partial reduction of its pressure as is usual in the separation of gas from crude mineral oil, whereby substantially complete separation of gas is effected at each stage at the pressure prevailing. It will be understood that useful liquid hydrocarbons are thus not entrained with the gas released at each stage, and that gas which should have been released at one stage is not carried forward to the next, and thus the excessive foaming or carrying over of liquid with gas on its rapid evolution at a lower pressure is avoided. By the avoidance of such losses in the practice of the invention it has been found that the use of gas compression or absorption plants for the treatment of the separated gas is rendered unnecessary.

An apparatus similar in construction to that illustrated in Figure 1 may be used for the separation of gas from petroleum or other stocks that have been subject to distillation or other treatment, and generally for the separation of gases from liquids whether the presence of gas is due to reduction of pressure, increase in temperature or any other cause.

It will further be understood that the invention is not confined to the construction hereinbefore specifically described with reference to Figures 1 to 4 of the accompanying drawings, as the construction in which the invention may be carried out admits of wide variation. Thus for example the space provided at the front of the gas separating unit or within the branch $f^1$ may be enlarged and extended, or also provided deeper for the purpose of facilitating the separate passage away of the gas and liquid, the reunited streams of liquid being passed through further sections of the pipe line in alignment with or continuation of the tube $b$ in a manner similar to that illustrated in Figure 6; while a gas outlet or outlets may be provided in the upper part of the spaces equivalent to the branch $f^1$ or its extension, and the gas passed to a common pipe line disposed in parallel position above.

Figure 5:
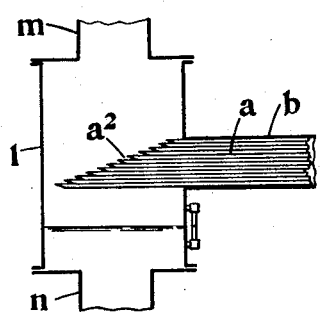
Figure 5 represents a modified form of apparatus in vertical section.

Thus as illustrated in Figure 5 the small tubes $a$ within the large tube or conduit $b$ may protrude into a casing of cylindrical or other form and of relatively large volume. The front ends of the tubes $a$ may be cut at a smaller angle than hereinbefore indicated with reference to Figures 1 to 4, and the front ends of the small tubes $a$ may also be so disposed as to lie at a smaller angle to the horizontal and thus the streams may discharge in a cascading flow over a considerable area of the ends of the tubes beneath whereby the gas and liquid leave the tubes evenly and smoothly and the separation of the gas in the spacious casing $l$ may be facilitated, the gas ascending and passing through the gas outlet pipe $m$, while the liquid passes down through the outlet $n$ under conditions such as hereinbefore described.

It will be understood that the liquid should rapidly pass from the ends of the tubes $a$ to avoid flooding of the lower tubes, which might result in partial restriction of flow through them and in partial re-mixture of the gas and oil. Thus in general it is preferred to provide the chamber in which the streams discharge as a casing of large volume as illustrated in Figure 5, and so to extend the small tubes $a$ therein that under varying conditions of operation the liquid and gas may freely flow away in the manner described and the liquid to pass into the lower part of the casing $l$ to be maintained there at a substantially constant level, from which it may be passed forward to the next stage of pressure reduction and gas separation.

Figure 6:
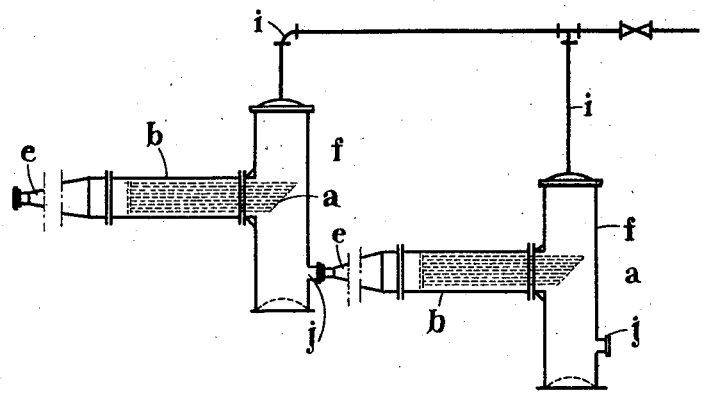
Figure 6 illustrates an apparatus for the multi-stage separation of gas in which two units only are shown, the other units required being similarly connected and the parts bearing the same reference letters as in Figure 1.

Again instead of providing a single gas separating unit comprising the small tubes $a$ within a large tube or conduit $b$, a number of such units may be provided as diagrammatically illustrated in Figure 6 with suitable connections to permit of the flow in series or in parallel therethrough of liquid from which the gas is to be separated. The arrangement may be such that there is a separation and withdrawal of gas at positions between the respective units. In such cases a series of units may be provided of nests of tubes of progressively smaller or larger diameter, and the units may be mounted in the same line or conduit or separately mounted or provided in parallel or otherwise.

Furthermore the manner or construction in which the narrow or shallow conduits or passages are provided may be varied. Thus instead of providing small tubes, the conduits may be provided by partitions disposed lengthwise to form closely lying passages of relatively small cross-section and the partitions or the small conduits may be extended into a casing of relatively large volume for the discharge of the streams passing in a manner substantially as hereinbefore described with reference to Figure 5, except that the partitions or conduits may extend successively forward from the bottom upwards in the manner indicated in Figure 6, so that on emerging from the small conduits the liquid falls in streams directly into the lower part of the casing $f$ (Figure 6), in such manner that the liquid discharges in separate streams or otherwise under conditions in which substantially no re-mixing of gas with the liquid takes place. In general however the use of small tubes or conduits of circular cross-section is preferred.

The small tubes or conduits may be finished or polished on the inside or electrolytically coated with a reguline film of metal, but in general sufficient smoothness of bore of the small tubes or conduits is ensured in the drawing of the tubes without any finishing operation.

The nest of small tubes or conduits may be mounted within the larger tube or conduit, and the latter may be used as a jacket for the circulation in the inter-tube spaces of a temperature controlling fluid medium and an inlet $d^1$ and an outlet $d^2$ (Figure 1) may be provided for the purpose through which the circulated fluid medium may be admitted and discharged; or where a larger enclosed tube or casing is not employed the small tubes or conduits may each be provided with such jacket for the same purpose.

The length of the small tubes or conduits in particular cases will depend upon the determined velocity or range in velocity of the liquid the diameter or depth of the small tubes or conduits used and the character or viscosity of the liquid. Their length may be approximately determined by calculation and may be readily confirmed by test in particular cases, but excess in their length beyond that actually or precisely sufficient for the purpose of effective separation of the gas in the manner indicated involves no material practical disadvantage.

I claim:

1. A method of separating gases from liquids in which they are suspended, consisting in dividing the liquid from which the gas is to be separated to flow in a plurality of narrow and substantially rectilinear streams, so determining the course and position of the streams that the minute bubbles of gas suspended in the liquid rise upwardly in direction at an angle to the direction of flow as the liquid and gas flow in the same direction, the bubbles of gas coalescing and accumulating in position above the surface of the liquid in the streams before the end of their course, and causing the streams at the end of their determined course to discharge and the gas to separate from the liquid.

2. A method of separating gases from liquids in which they are suspended, consisting in causing the liquid from which the gas is to be separated to be rendered turbulent, then dividing the liquid to flow at high velocity with reduced turbulence in a plurality of narrow and substantially rectilinear streams, so determining the course and position of the streams that the minute bubbles of gas suspended in the liquid rise upwardly in direction at an angle to the direction of flow as the liquid and gas flow in the same direction, the bubbles of gas coalescing and accumulating in position above the surface of the liquid in the streams before the end of their determined course, and causing the streams at the end of their course to discharge and the gas to separate from the liquid.

3. A method of separating gases from liquids in which they are suspended, consisting in dividing the liquid from which the gas is to be separated to flow in a plurality of narrow streams, so determining the course and position of the streams that the gas bubbles are segregated in position above the surface of the liquid, and causing the gas to flow with turbulence above the surface of the liquid in the streams before the end of the determined course, and causing the gas to separate from the liquid.

4. A method of separating gases from liquids under pressure, consisting in causing the liquid to be reduced in pressure in successive stages, whereby the gases are released and are suspended within the liquid after reduction in pressure in the respective stages, causing the liquid at each stage and after reduction in pressure to flow in a plurality of streams, so determining the course and position of the streams at each stage that the minute bubbles of gas suspended in the liquid are segregated in position above the surface of the liquid before the end of the course in the streams, and causing the streams at the end of the determined course at each stage to discharge and the gas to separate from the liquid.

5. A method of separating gases from liquids in which they are suspended, consisting in causing the liquid from which the gas is to be separated to flow in a plurality of narrow and substantially rectilinear streams, so determining the course and position of the streams that the minute bubbles of gas suspended in the liquid rise vertically in direction at an angle to the direction of flow, the bubbles of gas coalescing and accumulating above the surface of the liquid in the streams before the end of their course, and causing the streams at the end of their determined course to discharge in a cascading flow and the gas to separate from the cascading liquid.

6. A method of separating gases from liquids in which they are suspended, consisting in causing the liquid from which the gas is to be separated to flow in a plurality of narrow and substantially rectilinear streams, so determining the course and position of the streams that the gas bubbles are segregated from the liquid in a position above the surface of the liquid in the streams, causing a part of the liquid free of gas to pass out from a position below the streams before the end of their course, and causing the streams at the end of the determined course to discharge and the gas to separate from the liquid.

7. A method of separating gases from liquids in which they are suspended without the application of heat for the purpose of the separation, consisting in causing the liquid from which the gas is to be separated to flow with turbulence, then causing the liquid to flow with reduced turbulence by dividing it into a number of narrow and substantially rectilinear streams, so determining the course and position of the streams that the minute bubbles of gas suspended in the liquid rise vertically in direction at an angle to the direction of flow as the liquid and gas flow in the same direction, the bubbles of gas accumulating in position above the surface of the liquid in the streams before the end of their course, then causing the streams at the end of their determined course to discharge into a space of large capacity and causing the separated gas then to flow away and out of the said space in ascending streams and the liquid in descending streams.

8. A method of separating gases from liquids under pressure without the application of heat for the purpose of the separation, consisting in causing the liquid from which the gas is to be separated to flow with turbulence and to be partially reduced in pressure, then causing the liquid to be divided to flow in a plurality of narrow and substantially rectilinear streams, so determining the course and position of the streams that the minute bubbles of gas are segregated in position above the surface of the liquid in the streams before the end of their course and causing the streams at the end of their determined course to discharge and the gas to separate from the liquid.

9. Means for effecting the separation of gas from a liquid flowing in a pipe line, comprising a main conduit of such diameter that liquid flows therethrough in a turbulent stream, and a plurality of substantially rectilinear conduits long and narrow in cross-section set to form a compact nest in which the narrow conduits are closely disposed, the conduits in the said nest being disposed transversely to the vertical and so connected to the said main conduit that the liquid flowing through the main conduit enters and flows through the said nest, the pipe line having at a position immediately in front of the said nest a space within which the streams of liquid on emerging from the nest may discharge and the gas separate from the liquid, an outlet for the liquid discharged from the said nest and an outlet for the gas.

10. Means for effecting the separation of gas from a liquid flowing in a pipe line, comprising a plurality of substantially rectilinear conduits long and narrow in transverse cross-section set to form a compact nest in which the narrow conduits are closely disposed, a larger conduit within which the said nest is mounted, the said larger conduit being so connected in the pipe line that the turbulent stream of liquid flowing through the line passes through the conduits in the said nest, the pipe line having at a position immediately in front of the said nest a space within which the streams of liquid on emerging from the nest may discharge and in which the gas discharged may separate from the liquid, an outlet for the liquid discharged from the said nest and an outlet for the gas.

11. Means for effecting the separation of gas from a liquid flowing in a pipe line, comprising a plurality of substantially rectilinear conduits long and narrow in transverse cross-section set to form a compact nest in which the long and narrow conduits are closely disposed, a larger conduit in which the said nest is mounted and connected in the pipe line, means by which the liquid flowing through the pipe line may flow through the said nest and through the interstitial spaces between the long and narrow conduits and the larger conduit in which the nest is mounted, the pipe line having at a position immediately in front of the said nest a space in which the streams of liquid on emerging may discharge and in which the gas discharged into the space may separate from the liquid, an outlet for the liquid discharged from the said nest and an outlet for the gas.

12. Means for effecting the separation of gas from a liquid flowing in a pipe line, comprising a plurality of substantially rectilinear conduits long and narrow in transverse cross-section set to form a compact nest in which the narrow conduits are closely disposed, the said long and narrow conduits being disposed transversely to the vertical and so connected in the pipe line that the liquid flowing with turbulence through the line may pass through the said nest, the long and narrow conduits of the nest having their front ends extending successively forward from the top downwards to facilitate the cascading discharge of liquid from the long and narrow conduits in the nest, the pipe line having at a position immediately in front of the said nest a space within which the streams of liquid on emerging from the nest may discharge and in which the gas discharged into the said space may separate from the liquid, an outlet for the liquid discharged from the nest and an outlet for the gas.

13. Means for effecting the separation of gas from a liquid flowing in a pipe line, comprising a main conduit of such diameter that the liquid flows therethrough in a turbulent stream, a plurality of substantially rectilinear conduits long and narrow in transverse cross-section set to form a compact nest in which the narrow conduits are closely disposed, the conduits in the nest being disposed transversely to the vertical and so connected to the main conduit that the liquid flowing with turbulence in the main conduit enters and flows through the nest, the long and narrow conduits of the nest having their front ends extending successively forward from the top downwards to facilitate the cascading discharge of liquid from the nest, the said long and narrow conduits being also at their front ends cut at an acute angle and being so disposed that the angular front parts overhang the lower edges of the conduits, the pipe line having at a position immediately in front of the nest a space within which the streams of liquid on emerging from the nest may discharge and in which the gas discharged into the said space may separate from the liquid, an outlet for the liquid discharged from the nest and an outlet for the gas.

ARTHUR CLIFFORD HARTLEY.